US005762809A

United States Patent [19]
Luft et al.

[11] Patent Number: 5,762,809
[45] Date of Patent: Jun. 9, 1998

[54] PROCESS FOR TREATING A MEDIUM CONTAINING ORGANIC CONSTITUENTS

[75] Inventors: Gerhard Luft, Muehltal, Germany; Karl-Heinz Gregor, Mollem-Asse, Belgium; Hermann Schwarz; Farsin Yadegardjam, both of Darmstadt, Germany; Karl Baur, Baierbrunn, Germany

[73] Assignee: SOLVAY Interox (Société Anonyme), Brussels, Belgium

[21] Appl. No.: 732,457

[22] PCT Filed: May 4, 1995

[86] PCT No.: PCT/BE95/00045

§ 371 Date: Jan. 21, 1997

§ 102(e) Date: Jan. 21, 1997

[87] PCT Pub. No.: WO95/30627

PCT Pub. Date: Nov. 16, 1995

[30] Foreign Application Priority Data

May 5, 1994 [DE] Germany .................. 44 15 911.0

[51] Int. Cl.$^6$ ...................................................... G02F 1/72
[52] U.S. Cl. ...................... 210/759; 210/761; 210/908
[58] Field of Search .................................. 210/758, 759, 210/761, 609, 908

[56] References Cited

U.S. PATENT DOCUMENTS 3,649,534  3/1972  Schotte .
4,155,848  5/1979  Sato et al. .
4,221,661  9/1980  Shimizu et al. .
5,364,538  11/1994  Stultz et al. .

FOREIGN PATENT DOCUMENTS 0189155  7/1986  European Pat. Off. .
2728554  1/1978  Germany .
2838386  1/1980  Germany .

*Primary Examiner*—Neil McCarthy
*Attorney, Agent, or Firm*—Spencer & Frank

[57] ABSTRACT

A process is proposed for the chemical oxidative treatment of a medium, e.g. sewage sludge, containing organic constituents, which comprises two process steps. In the first process step, the medium is heated to a first preset low temperature range and kept in this temperature range for a preset treatment duration. In a second process step, the sludge is then heated to a second preset low temperature range, pressurized in a preset low pressure range and kept in this temperature and pressure range for a preset treatment duration. In the course of this, an oxygen-containing gas, e.g. air or oxygen-enriched air or technical grade oxygen is introduced into the medium at least intermittently. The low temperatures and pressures provided in the two process steps are below or at most in the lower third of the temperature and pressure ranges of 150°–370° C. and 10–220 bar conventional in the wet-oxidation processes. Between the first and second process step or during the second process step, a predetermined amount of hydrogen peroxide is added to the medium. By means of this process, a substantial degradation of the chemical oxygen demand (COD) of the medium and a great reduction in volume of the solids content of the medium are achieved.

13 Claims, No Drawings

PROCESS FOR TREATING A MEDIUM CONTAINING ORGANIC CONSTITUENTS

FIELD OF THE INVENTION

The invention relates to a process for the chemical oxidative treatment of a medium containing organic constituents.

TECHNOLOGY REVIEW

A medium containing organic constituents is taken to mean, e.g. sludges which arise in biological cleanup of wastewater. For example, primary sludge arises in sewage treatment plants, which is formed in a primary sedimentation of the wastewater. In addition, excess sludge is formed in the biological cleanup stage of the sewage treatment plant. Finally, digested sludge further arises in digestion towers of sewage treatment plants. Usually, these sludges are disposed of by landfilling them, incinerating them or spreading them on fields. However, the landfill space available is in increasingly short supply, as a result of which this method of disposal is constantly becoming more expensive. Incineration of the sludges requires high energy expenditure. Moreover, pollutants are released into the environment by the exhaust air in this method. Spreading on fields is also problematical, since there is the risk of contaminating the soils with heavy metals.

In the present patent application, media containing organic constituents, in addition to sludges from sewage treatment plants, are also taken to mean waste-waters, landfill leachate waters, soils contaminated by organic pollutants etc. For example, polluted soil can be slurried with water and treated in a similar manner to sewage sludge.

A known process for degrading the organic constituents of such media by a chemical oxidative route is so-called wet oxidation. Wet oxidation is taken to mean the reaction of (atmospheric) oxygen with organic compounds in an aqueous phase at temperatures of 150°–370°C. and pressures in the range of 10–220 bar. Such a process is described, for example, in DE-B2-27 28 554. However, because of the high temperatures and pressures required, the conventional processes for wet oxidation result in high capital and operating costs. In processes for wet oxidation which operate in the lower temperature range of 150°–175° C. and at pressures of 10–20 bar, in addition a catalyst must be added and the pH must be decreased to 0.5–1.5, in order to make the oxidation reactions possible. Moreover, in these low-pressure processes, complete oxidation of the organic constituents is not obtainable, which requires an additional downstream treatment process.

SUMMARY OF THE INVENTION

The object underlying the present invention is to provide a process by which media containing organic constituents can be disposed of in an economical manner in an as environmentally friendly manner as possible.

DETAILED DESCRIPTION OF THE INVENTION

This object is achieved according to the invention by the fact that a) the medium is heated in a first process step to a temperature within a first preset low temperature range and kept in this temperature range for a first preset treatment duration, b) the medium, in a second process step, is brought to a temperature within a second preset low temperature range and pressurized at a pressure within a preset low pressure range and kept in this temperature and pressure range for a second preset treatment duration, an oxygen-containing gas being introduced into the medium at least intermittently, and c) between the first and second process step and/or during the second process step, hydrogen peroxide is added to the medium.

Low temperature and pressure ranges in the context of the present invention are taken to mean those temperature and pressure ranges which are considered low in comparison to the temperatures and pressures conventionally used in chemical oxidative processes. Accordingly, the low temperatures and pressures intended in the two process steps lie below or at most in the lower third of the temperature and pressure ranges of 150°–370° C. and 10–220 bar conventional in wet-oxidation processes.

Preferably, the upper and lower limits of the temperature range preset in the first process step are below the upper and lower limits respectively of the temperature range preset in the second process step.

Thus, in the first process step, a temperature range of approximately 70 to approximately 180° C. and a treatment duration of at least 10 minutes are advantageously preset, while in the second process step a temperature range of approximately 100° to approximately 200° C., a pressure range of approximately 3 to approximately 30 bar and a treatment duration of at least 10 minutes are provided.

A temperature range markedly below the temperatures conventional in wet-oxidation processes, that is markedly below 150° C., is expediently preset for the first process step, while for the second process step, temperature and pressure ranges are employed which are roughly at the lower limit of the temperature and pressure ranges conventional in low-pressure wet-oxidation processes.

Accordingly, in the first process step, a temperature range of approximately 80° to approximately 110° C. and a treatment duration of at least 20 minutes are preferably preset and in the second process step a temperature range of approximately 140 ° to approximately 160° C., a pressure range of approximately 5 to approximately 15 bar and a treatment duration of at least 20 minutes are preferably preset.

Preferably, a treatment duration of one hour is not exceeded in each case in the first and second process step.

It has been shown that particularly good results with respect to the degradation of organic constituents of the medium and with respect to the reduction in volume of the medium are achieved if certain narrow limits are kept to for the temperature and pressure range and the treatment duration. Thus, according to a particularly preferred embodiment of the invention, in the first process step the medium is heated to approximately 90° to approximately 100° C. and kept at this temperature for approximately 30 minutes and, in the second process step, the medium is heated to approximately 150 °C., pressurized to approximately 10 bar and kept at this temperature and this pressure for approximately 30 minutes.

Underlying the present invention is the finding that by means of a combination of a process which corresponds to a wet oxidation at low temperatures and pressures and a chemical treatment using hydrogen peroxide, a very substantial degradation of organic constituents of the medium to be treated and a very great decrease in volume of the solids portion of the medium can be achieved. It has been shown that the individual reaction mechanisms in such a process influence each other in such a way that particularly good results can be achieved at a defined combination of temperature range, pressure range and treatment duration.

An additional activation of the hydrogen peroxide by UV irradiation or addition of a catalyst is not necessary in the process according to the invention.

It is also essential that the medium is first heated to a preset temperature range in a first process step and kept in this temperature range for a preset treatment duration, since sludges from biological waste-water cleanup in particular contain an enzyme which is termed catalase and has the property of decomposing hydrogen peroxide without itself being attacked. The pretreatment of the medium in the first process step reliably destroys this enzyme.

The following mechanisms of action presumably underlie the process according to the invention:

The pretreatment in the first process step first effects destruction of the catalase so that in the second process step hydrogen peroxide can be added, without decomposition of the hydrogen peroxide needing to be feared. The temperature elevation in the second process step then achieves an activation of the hydrogen peroxide so that hydroxyl free radicals are formed to an increased extent. The medium is simultaneously depleted in hydrogen peroxide and oxidation reactions occur to a greater extent. In parallel to the oxidation, a recombination of the hydroxyl free radicals proceeds, which does not contribute to the oxidation. The ratio between the oxidation reaction and the recombination is temperature-dependent.

With increasing temperature, an accelerated free-radical formation takes place. Similarly, the ratio of the oxidation reaction to the recombination reaction is also displaced. Increasing hydroxyl free-radical concentrations make recombination more probable. From a certain temperature, the ratio inverts, and the recombination then predominates over oxidation.

In parallel to the oxidation process described there proceeds a second oxidation process which is to be assigned to the principle of low-pressure wet oxidation, that is oxidation by dissolved oxygen at elevated temperature and elevated pressure.

At a temperature of 150 °C., the oxidation of the medium, for example activated sludge from a biological sewage treatment plant, may comprise ⅓ wet oxidation and ⅔ oxidation by hydrogen peroxide.

The mechanisms of action underlying the process according to the invention are summarized in the following table:

| Activation: | $H_2O_2$ | Temperature $\rightarrow$ | 2.OH | $(r_1)$ |
|---|---|---|---|---|
| Oxidation: | .OH + Organic compound | Temperature $\rightarrow$ | Product | $(r_2)$ |
| Recombination: | 2.OH | Temperature $\rightarrow$ | ½ $O_2$ + $H_2O$ | $(r_3)$ |
| Wet oxidation: | $O_2$ + Organic compound | Temperature/ pressure $\rightarrow$ | Product | $(r_4)$ |

During the treatment of the medium in the second process step, a pH of the medium of approximately 3– approximately 4 is preferably maintained.

The medium is expediently thoroughly mixed during the second process step e.g. by stirring or injecting a gas in order to ensure good mass transfer. The medium is particularly preferably made turbulent when oxygen-containing gas is introduced into it.

Oxygen-containing gas can be introduced continuously over the entire treatment duration during the second process step or discontinuously, if appropriate, also with varying intensity. The oxygen-containing gas used can be air. Preferably, oxygen-enriched air or technical grade oxygen is used.

The hydrogen peroxide can likewise be added continuously or at intervals. Preferably the hydrogen peroxide is added at the beginning of the second process step in an amount which permits the desired oxidation of the organic constituents of the medium. The amount added is matched to the particular application and the particular property of the medium to be treated, where a linear correlation between increasing degree of oxidation and increasing hydrogen peroxide concentration can be assumed.

The process according to the invention has decisive advantages in comparison with the prior art:

Since in comparison to the conventional wet-oxidation processes, very low temperatures and pressures and short treatment times are sufficient in the proposed process, the process operates very much more cost effectively. Also, no pH decrease to 0.5–1.5 is necessary, as is the case in the known low-pressure wet-oxidation processes. A pH of approximately 3 to approximately 4 can be employed in the process according to the invention. Since the natural pH of sewage sludge also varies in this range, neutralizing agent can be completely dispensed with under some circumstances. However, at least very much less neutralizing agent is necessary than in the known low-pressure wet-oxidation processes. Moreover, in the process according to the invention, in contrast to the known low-pressure wet-oxidation processes, no addition of catalysts, such as iron, is necessary. Also, additional activation of the hydrogen peroxide by UV irradiation is not necessary.

In the treatment of sludges arising in biological wastewater cleanup, the proposed process simultaneously permits a diminution in sludge volume, an improved dewaterability and also sanitization and AOX reduction of the sludges. Therefore, the sludges treated can be utilized e.g. as nutrient in agriculture and forestry, so that return to the natural cycle is possible.

The process can be employed in all biological plants in which problems occur in relation to treatment and disposal of sludges from the primary sedimentation, the biological cleanup stage or the sludge digestion. Because of the good dewaterability of the treated sludges achieved by the process according to the invention, and a reduction of the amount of sludge to about half (expressed as dry matter), a small residual sludge volume results. At relatively high addition of hydrogen peroxide, e.g. an amount of ⅓ of the amount of hydrogen peroxide necessary for complete oxidation, the dry matter of activated sludge decreases by about ⅔.

Furthermore, the process may be advantageously used in wastewater treatment, leachate water treatment and soil remediation. If the process is used in soil remediation, the excavated soil is expediently first slurried with water to give a soil suspension which can then be treated in a similar manner to sewage sludge by the process according to the invention.

The process according to the invention can be used particularly preferably for precleaning wastewater. In the biological cleanup of industrial wastewaters, for example, a not inconsiderable proportion of wastewater ingredients is degraded by the microorganisms only insufficiently, if at all. These so-called refractory chemical compounds thus pass into the outfall, where they lead to the known adverse consequences, for example rapid oxygen disappearance with fish dying, formation of malodours, etc. On the other hand, these refractory substances are likewise adsorptively accumulated on the activated sludges, which then have to be disposed of as special waste at great expense.

If the process according to the invention is used for precleaning such wastewaters, it is possible to achieve an almost complete removal of the refractory compounds. This takes place in significantly less, time and to a far more complete extent than in the conventional biological cleanup. In this connection, however, attention is mainly focused on carrying on the oxidation if possible partially only until the refractory compounds are worked up to such an extent that they become degradable by biological means and hence inexpensively. The process must in this case be considered as a pretreatment step prior to a biological treatment or some other further treatment.

The precleaning of the wastewater is preferably carried out as follows:

Before entry into a biological (or other) cleanup stage, the refractory compounds are chemically-oxidatively treated so that only biodegradable compounds pass into this further wastewater cleanup stage. The oxidation is achieved by a combination of atmospheric oxygen or technical grade oxygen and hydrogen peroxide. The reaction is advantageously carried out in an autoclave which is operated semicontinuously. The amount of hydrogen peroxide used is substoichiometric in relation to the chemical oxygen demand (COD), i.e. extremely inexpensive.

The process operates at elevated pressure between 10 bar and 20 bar and in the temperature range from 100° to 150° C. The reaction times are only a few minutes, and the reaction preferably takes place in an acid medium. What is particularly remarkable is the fact that the use of a catalyst can be dispensed with entirely, so that there is no need for an additional step for removing, further treating and/or recovering a catalyst.

Such a precleaning step has a number of advantages:

The reaction conditions are milder than in conventional oxidation processes, yet, surprisingly, no catalyst is needed. Pressure, temperature and reaction times are low. What is particularly advantageous is the fact that, as a consequence of the reaction conditions, otherwise customary corrosion problems and the use of highly corrosion-resistant, expensive materials are avoided.

Possible uses for the process arise with preference in relation to industrial production waste-waters which can only be cleaned incompletely. The simple apparatus requirement coupled with the small space requirement make possible a use in existing wastewater cleanup plants.

The invention is described in more detail below with reference to an illustrative example which relates to the treatment of activated sludge from a biological sewage treatment plant:

The sludge for example taken off as excess sludge from a biological sewage treatment plant is passed into a reactor where it is first heated to 100 °C. for about half an hour in order to destroy the enzyme catalase. The sludge is then pumped into a stirred autoclave to carry out the second process step. A predetermined amount of hydrogen peroxide is then added to the sludge. This amount depends on the desired degree of oxidation of the treated sludge. In addition, a pH of 3 is set in the sludge by addition of a small amount of concentrated sulphuric acid. The sludge is heated to a temperature of 150 °C. and pressurized to 10 bar. The sludge is kept at this temperature and this pressure for a treatment duration of 30 minutes. In order to ensure good mass transfer, the sludge is stirred for the treatment duration and an oxygen-containing gas, preferably oxygen-enriched air or technical grade oxygen is introduced into the sludge.

After a treatment time of 30 minutes in the stirred autoclave, the sludge is taken off and can be fed to further utilization. The treated sludge has completely different properties from the untreated sludge. The treated sludge sediments rapidly, therefore it can be readily dewatered. Moreover, during the treatment, sanitization of the sludge takes place, since pathogenic microorganisms and helminth eggs are reliably destroyed in the reactor. A further advantage which may be mentioned is a reduction of AOX, since halogenated organic compounds are destroyed. In general, during the treatment, large organic molecules which are biologically resistant (refractory) are broken down into smaller biodegradable molecules. An aqueous phase can be separated off from the treated sludge, which aqueous phase principally contains carboxylic acids which make up a considerable part of the COD (Chemical Oxygen Demand) which has not been destroyed. The carboxylic acids are readily biodegradable, so that the liquid phase can be returned to a biological sewage treatment plant. This differentiates the process according to the invention fundamentally from other processes in which sludge filtrates having a high refractory COD portion are generated, which sludge filtrates can no longer be degraded in the biological part of a sewage treatment plant.

If it is assumed that hydrogen peroxide is used in a weight ratio 1:1 to dry matter and the operating parameters mentioned are complied with, a decrease of the total COD content of sludge by approximately 90% and a decrease of the sludge volume by approximately 60% are achieved.

The present illustrative example relates to a discontinuous mode of operation in which the reactor for carrying out the first process step and the stirred autoclave for carrying out the second process step are charged with the sludge batchwise. However, a continuous mode of operation is also possible, the sludge, to carry out the first process step, being first passed through a first reactor and then, to carry out the second process step, being passed through a second reactor.

Furthermore, it is possible to use just a single reactor to carry out both process steps. In this case the sludge is first heated in the reactor to 100° C. in order to destroy the enzyme catalase. After a 30-minute treatment time at this temperature, a predetermined amount of hydrogen peroxide is added to the reactor. The reactor is then further heated to 150° C. and pressurized to 10 bar. The reactor is kept for 30 minutes at this temperature and this pressure. During this time, the sludge in the reactor is stirred and an oxygen-containing gas, in particular oxygen-enriched air or technical grade oxygen, is introduced. The pH of the sludge is adjusted to 3. After a 30-minute treatment time, the supernatant liquid phase is taken off and fed to a biological sewage treatment plant. The sludge is withdrawn from the reactor and, after dewatering, can be fed to further utilization.

What is claimed is:

1. A process for chemical oxidative treatment of a medium containing organic constituents, comprising:
   a) heating the medium at its natural pH in a first process step to a preset temperature within a range of 70° to 100 °C. and maintaining this temperature range for a first preset treatment duration of at least 10 minutes,
   b) heating the medium, in a second process step, to a temperature within a second preset temperature range of 140° to 200 °C. at a pressure range of 3 to 20 bar and kept in this temperature and pressure range for a second preset treatment duration of at least 10 minutes, while introducing an oxygen-containing gas into the medium at least intermittently, and
   c) between the first and second process step and/or during the second process step, adding hydrogen peroxide to the medium.

2. The process according to claim 1, including in the first process step, maintaining a temperature in a range from approximately 80° to approximately 110 °C. and a treatment duration of at least 20 minutes and, in the second process step, maintaining a temperature range from approximately 140° to approximately 160° C., a pressure range of approximately 5 to approximately 15 bar and a treatment duration of at least 20 minutes.

3. The process according to claim 1, including in the first process step, heating the medium to approximately 90° to approximately 100° C. and this temperature for approximately 30 minutes and, in the second process step, heating the medium to approximately 150 °C. and pressurizing to approximately 10 bar and maintaining this temperature and this pressure for approximately 30 minutes.

4. The process according to claim 1, wherein a pH of the medium of approximately 3–4 is maintained during the second process step.

5. The process according to claim 1, wherein the medium is thoroughly mixed during the second process step.

6. The process according to claim 1, wherein liquid phase arising in the second process step is taken off and subjected to a biological cleanup.

7. The process according to claim 1, wherein the medium used is wastewater which contains refractory compounds and which is processed in the first and second process steps so that the refractory compounds are converted into biodegradable compounds which are degraded in a subsequent biological cleanup stage.

8. Process according to claim 1, wherein the medium in the second process step is brought to a temperature within a second preset low temperature range of approximately 140° to approximately 160° C.

9. Process according to claim 1, wherein the second process step is carried out at a pressure range of 3 to 15 bar.

10. Process according to claim 1, wherein the maximum treatment duration in the second process step is about 1 hour.

11. A process for chemical oxidative treatment of a medium containing organic constituents, consisting of:

(a) heating said medium at its natural pH in a first process step to a preset temperature within the range from approximately 90° to approximately 100° C. and maintaining this temperature range for a first preset treatment duration of approximately 30 minutes, (b) heating the medium, in a second process step, to a temperature within a second preset temperature range of approximately 140° to approximately 160° C. at a pressure range of approximately 3 to approximately 15 bar and kept at this temperature and pressure range for a second preset treatment duration of approximately 30 minutes at a pH of approximately 3–4, while thoroughly mixing the medium and introducing an oxygen-containing gas into the medium at least intermittently, and (c) adding hydrogen peroxide to the medium between the first and second process step and/or during the second process step.

12. The process according to claim 11, wherein any liquid phase arising during the second process step is taken off and subjected to a biological cleanup.

13. The process according to claim 11, wherein the medium used is waste water which contains refractory compound and which is processed in the first and second process steps so that the refractory compounds are converted into biodegradable compounds which are degraded in a subsequent biological cleanup stage.

* * * * *